Aug. 19, 1924.
A. REYNOLDS
COOKER
Original Filed Dec. 29, 1919    3 Sheets—Sheet 1
1,505,670
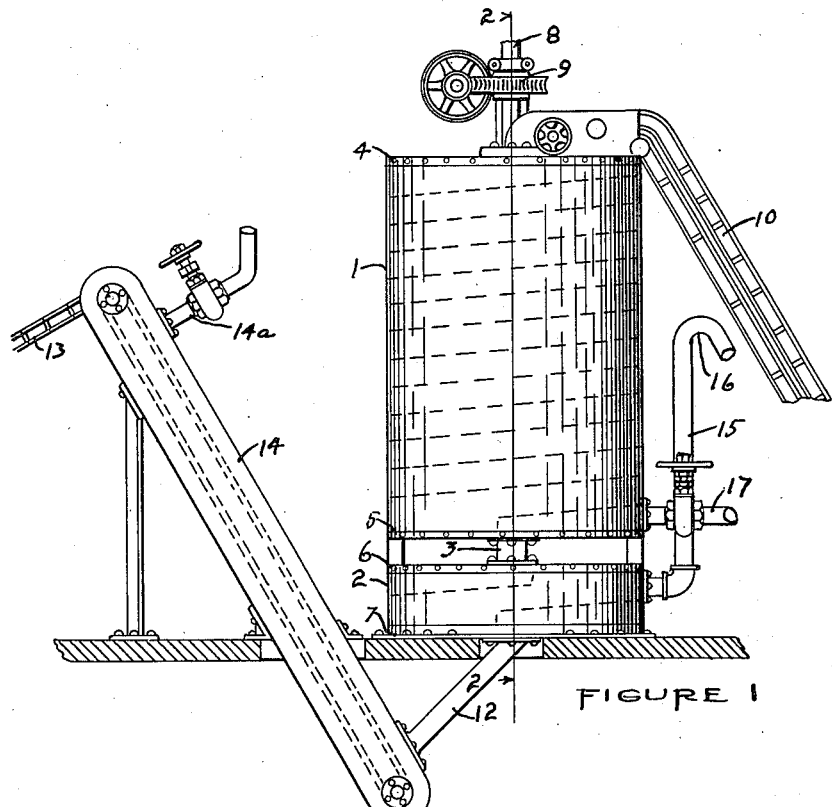
FIGURE 1
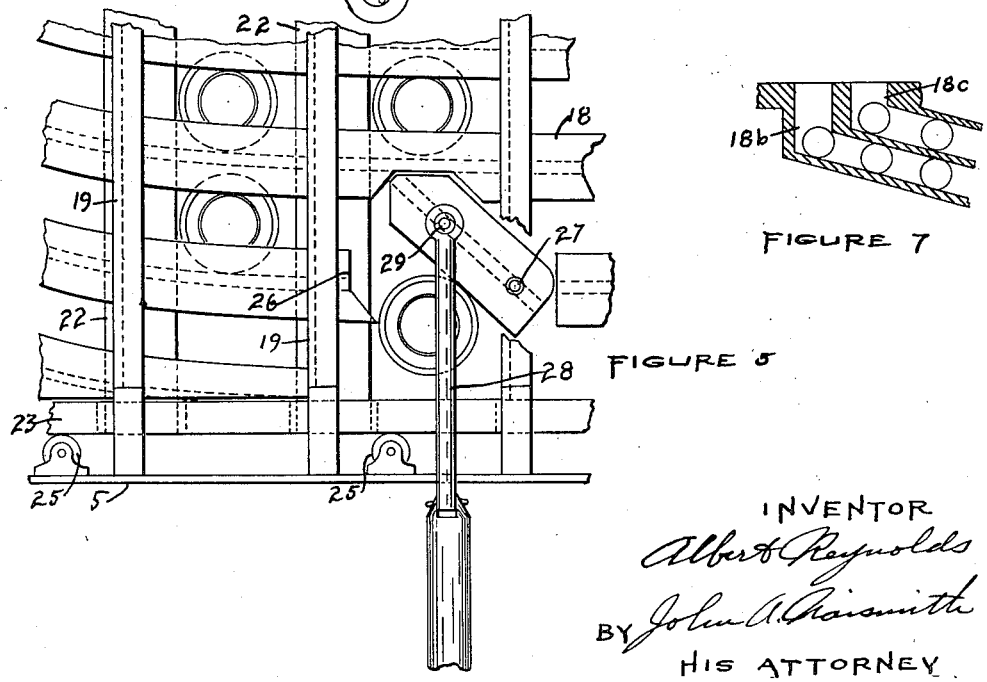
FIGURE 7
FIGURE 5
INVENTOR
Albert Reynolds
BY John A. Naismith
HIS ATTORNEY

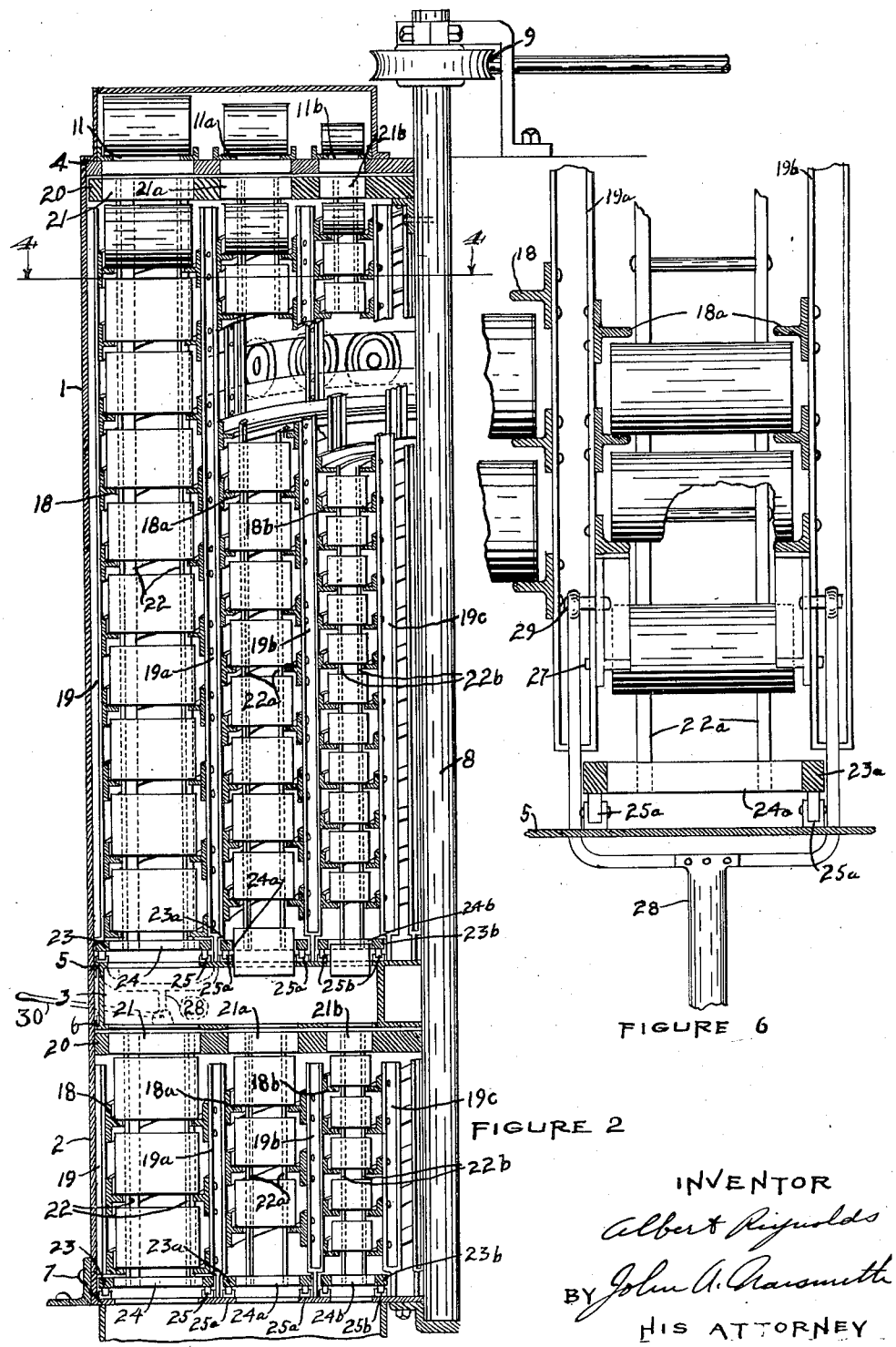

Patented Aug. 19, 1924.

1,505,670

UNITED STATES PATENT OFFICE.

ALBERT REYNOLDS, OF SAN JOSE, CALIFORNIA, ASSIGNOR TO ANDERSON-BARN-GROVER COMPANY, OF SAN JOSE, CALIFORNIA, A CORPORATION OF CALIFORNIA.

COOKER.

Application filed December 29, 1919, Serial No. 348,006. Renewed February 14, 1923.

*To all whom it may concern:*

Be it known that I, ALBERT REYNOLDS, a subject of the King of Great Britain, and resident of San Jose, in the county of Santa Clara and State of California, have invented certain new and useful Improvements in Cookers, of which the following is a specification.

My invention relates to a machine for use in cooking canned goods.

It is one object of my invention to provide a cooker which may be so constructed and operated that a given canned product may be cooked for a predetermined period of time determined by the nature of the product and the degree of heat to which it is subjected. I also contemplate providing a cooker which may be so constructed and operated that various sizes of cans may be passed therethrough. A further object of my invention is to provide suitable means for varying the time of the cook by varying the speed with which the cans are moved through the cooker, or by shortening or lengthening the distance travelled by the cans, or by a combination of both of these means. A still further object is to provide a means whereby the cans may be passed from the cooker into a cooling chamber and subjected to gradually increasing pressure until sufficiently cooled for discharging, and to provide automatic means for maintaining the desired pressure. Finally, it is an object of my invention to provide a cooker that will be economical in construction and operation, and particularly in the space occupied by a cooker of given capacity, and capable of use as a pressure cooker or not as desired.

In the drawings:

Figure 1 is a side elevation of my improved cooker.

Figure 2 is an enlarged view of one half of a section taken on line 2—2 of Figure 1.

Figure 5 is a detail side elevation of the track opening device in position.

Figure 6 is a front elevation of the track opening device in position.

Figure 7 is a diagrammatical illustration of one arrangement of the inner spiral tracks of my improved cooker.

Figure 3:
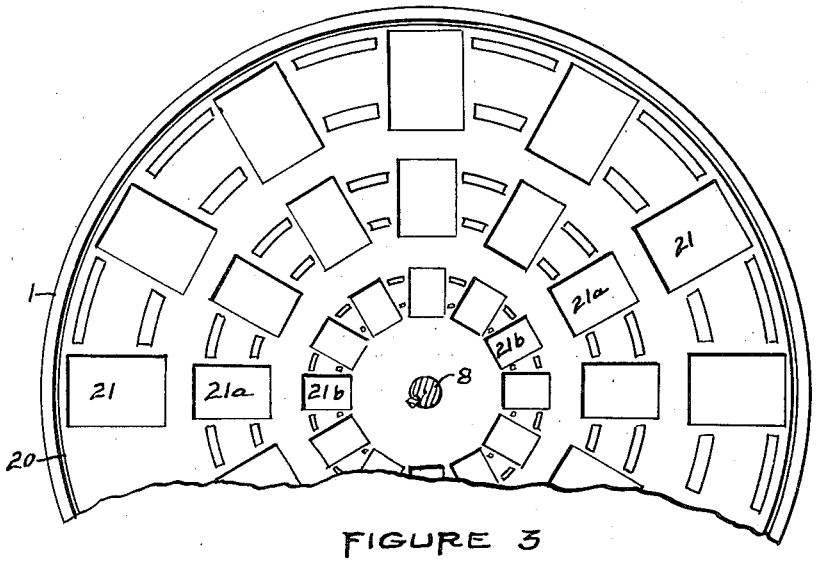
Figure 3 is a plan view of the cooker with the top plate and the feeding mechanism removed.
Figure 4:
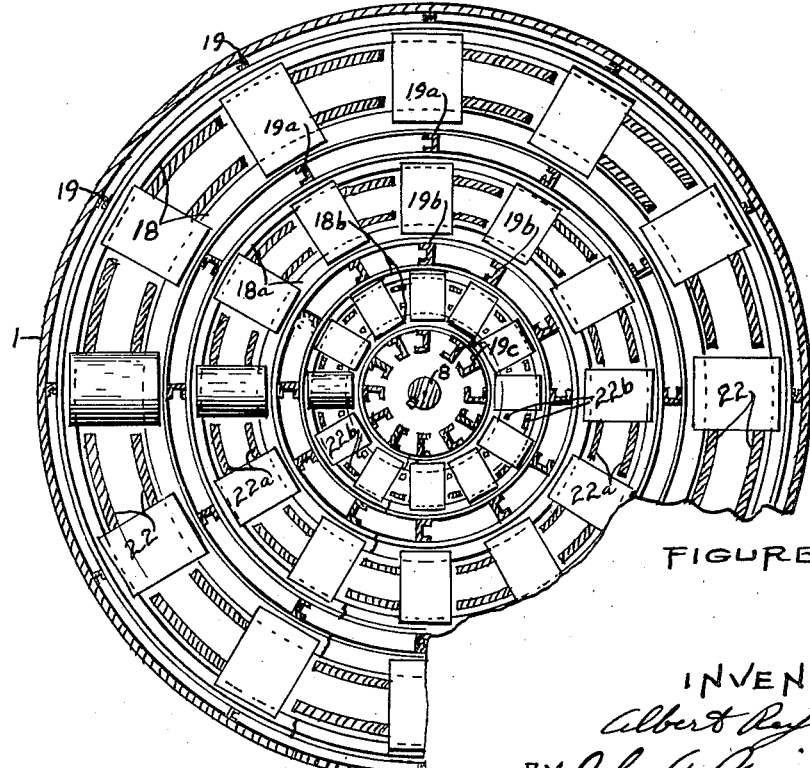
Figure 4 is a sectional view as of on line 4—4 of Figure 2.

Referring now more particularly to the drawings, 1 indicates a hollow cylindrical cooking chamber supported upon a similarly formed hollow cylindrical cooling chamber 2 and connected therewith by a radially positioned can passage 3. These chambers are closed at their ends by plates 4 and 5, and 6 and 7 respectively. An axially positioned shaft is shown in said chambers at 8 and driven by a worm gear 9 by means of suitable power driven connections not shown. At 10 is shown a conveyor discharging cans into the top of chamber 1 through can passages 11—11$^a$—11$^b$ formed in the top plate 4 thereof.

At 12 is shown a downwardly and angularly positioned chute connected to cooler 2 and receiving cans therefrom and discharging the same upon an upwardly travelling conveyor 13 suitably enclosed as shown at 14. A water inlet is operatively connected to the upper portion of conveyor enclosure 14 as at 14$^a$, and an overflow pipe is connected to cooling chamber 2 as shown at 15, the same extending upwardly a distance to a point 16 whereby the height of the water in the chambers may be maintained. The water in the cooker chamber 1 is heated by means of a suitable steam connection as at 17 whereby a suitable quantity of steam may be injected into the water in chamber 1 to maintain a required temperature therein.

The cans entering chamber 1 through openings 11—11$^a$—11$^b$ travel through the said chamber upon a series of spirally arranged concentric tracks 18—18$^a$—18$^b$ formed of angle irons supported upon concentric rows of vertically positioned U bars 19—19$^a$—19$^b$—19$^c$ rigidly mounted in chamber 1 as shown but unattached at their upper ends and spaced a distance from the top plate 4 of said chamber.

As a means for properly spacing and moving the cans along said tracks I provide a plate 20 keyed to shaft 8 beneath plate 4, and provided with a plurality of rows of radially arranged can openings as at 21—21$^a$—21$^b$, each row being adapted to register successively with the openings 11—11$^a$—11$^b$ in plate 4 and permit, in the present instance, three cans to drop through to their respective tracks 18—18$^a$—18$^b$.

Securely fastened to the under side of plate 20 between the successive rows of openings therein, are depending push members as shown at 22—22ᵃ—22ᵇ, one pair of said rods being provided between each two openings in plate 4 and so spaced as to pass downwardly just within the two angle irons forming the track in conjunction with which they operate. The lower ends of all of the rods of each series are fixed in rings as shown at 23—23ᵃ—23ᵇ, each ring being provided with can openings as 24—24ᵃ—24ᵇ corresponding with the openings in plate 20 and travelling upon and supported by rollers as 25—25ᵃ—25ᵇ mounted upon the bottom plate 5 of the chamber.

Since the construction of the cooling chamber 2 is the same as that of the cooking chamber 1, similar reference characters are used to designate similar parts therein.

Assuming that flowing water is entering at 14ᵃ and discharging at 16 thereby maintaining a given height of water in chamber 1 as indicated at 16ᵃ. Steam entering at 17 keeps the water in chamber 1 at the desired temperature and fills the upper portion of the said chamber with steam. The operation of shaft 8 causes plate 20, rods 22—22ᵃ—22ᵇ and rings 23—23ᵃ—23ᵇ in each chamber to revolve as a unit. The cans fed to the machine by conveyor 10 are permitted to drop, three at a time, upon their respective tracks as the successive rows of radially arranged openings in plate 20 register with the single row of openings 11—11ᵃ—11ᵇ in top plate 4. As the cans are deposited upon their respective tracks they are properly spaced and moved along by the push rods 22—22ᵃ—22ᵇ as shown, being carried around the interior of the chamber 1 until discharged through passage 3 into the chamber 2 containing cooling water. The cans are fed into chamber 2, carried through the same and discharged therefrom in the same manner as described in connection with their travel through chamber 1. Upon being discharged from chamber 2 the cans pass through chute 12 to conveyor 13 by means of which they are removed for packing.

It should be noted that in this construction the cans may be first subjected to steam heat and then hot water thereby affording a gradual heating of the contents thereof.

If canned goods requiring cooking under pressure, such as vegetables, are to be passed through the machine then the head of water therein is adjusted to the pressure desired, and this adjustment may be effected in the embodiment illustrated, by raising or lowering the overflow 16 and, of course, the discharge end of the conveyor enclosure 14. Canned goods entering the top of the chamber 1 are gradually heated through as they travel downwardly through the cooker, the external pressure thereon gradually increasing as they enter the water and travel toward the bottom of said chamber, thereby balancing the internal pressure generated by the cooking of the can contents.

It is clear from the foregoing that the present invention does not reside solely in the specific embodiment herein presented, but includes any form of cooker in which continuously moving canned goods are subjected to gradually increasing pressure during the cooking process, and in which this gradually increasing pressure is continued during the initial cooling of the cans, and in which the pressure is gradually reduced as the temperature of the cans approaches normal.

The last step above referred to is considered desirable because a can discharged from a cooker ordinarily is subjected to material interior strain because of the sudden change in the temperature upon the exterior thereof. By passing the cans down through chute 12 the water pressure upon the exterior thereof still further increases and counteracts the interior pressure of the can during the initial cooling process. The interior pressure reduces as the can is cooled and descends and is picked up by conveyor 13 so that when the normal external temperature and pressure is attained the interior pressure and temperature is also substantially normal and the can is subjected to no strains that tend to weaken the seams thereof or to rupture the can.

It should here be pointed out that a machine of the character indicated is particularly adapted to the purpose in view because it combines in one machine the essential qualities of a good cooker. It handles a maximum number of cans in a minimum number of cubic feet of space; different sized cans may be passed through the cooker at the same time; different sized cans or cans containing different kinds of goods may be timed to cook for different periods at the same time; the canned goods are subjected to no sudden changes in temperature; the cans are subjected to no sudden changes in pressure; the cans are sufficiently cooled for handling upon their discharge from the machine; the movement of the cans is smooth and uniform throughout their travel through the cooker; and the machine is simple in its operation, and includes but few moving parts.

Ordinarily the timing of the cook may be regulated by varying the speed with which the cans are passed through the cooker. As an additional means of varying the cook a track may be cut at any place or places as indicated at 26 and the cut portion pivoted as at 27 so that it can be raised or lowered as by a forked rod 28 pivotally attached thereto as at 29 and operated by a lever 30 from the outside of the chamber 1. By this means any portion or portions of a spiral may be cut out and the travel of the can shortened.

In a cooker of this type cans of different sizes may be passed through at the same time. Where the cooker is arranged for cans of several sizes as in the one illustrated, the inner spiral will take the smallest cans, and will, in some cases, permit the using of a pair of spirals as indicated in Figure 7 at 18$^b$ and 18$^c$ fed simultaneously with a single feeding of spirals 18 and 18$^a$.

It is understood, of course, that changes in form, proportions, construction and method of operation may be changed within the scope of the appended claims.

I claim:

1. A cooker including a vertically positioned cooking chamber, an inclined helical track passing therethrough, a cooling chamber, an inclined helical track passing therethrough and receiving cans from said first mentioned track, enclosed means exterior to the cooling chamber for removing cans discharged from said cooling chamber and means for maintaining a given height of liquid in said chambers and enclosed means to submerge a portion of said track and removing means.

2. A cooker including a vertically positioned cooking chamber, means for moving cans therethrough, means for discharging cans therefrom, a cooling chamber positioned below said cooking chamber and adapted to receive cans discharged therefrom, means for moving cans through said cooling chamber, means for discharging cans therefrom, a conveyor adapted to receive cans from said cooling chamber, an enclosure for said conveyor, and means for maintaining a given height of liquid in said chambers and said conveyor enclosure whereby the cans are subjected to gradually increasing and then gradually decreasing hydrostatic pressure.

3. A cooker including a vertically positioned cooking chamber, an inclined helical track passing therethrough, a cooling chamber below the cooking chamber communicating therewith, an inclined helical track passing therethrough and receiving cans from said cooking chamber, enclosed means for removing cans discharged from said cooling chamber, means exterior to the cooling chamber for maintaining a given height of liquid in said chambers and enclosed means to submerge a portion of said track and removing means, and means for heating the liquid in said cooking chamber.

4. A cooker including a receptacle, means for maintaining a required head of liquid therein, means for heating the upper portion of said liquid, means for moving a continuous succession of cans through said heated liquid to a depth whereby the internal pressure of the can is substantially balanced by the hydrostatic pressure of the liquid, means for moving the cans into the lower portion of the liquid whereby they are subjected to greater hydrostatic pressure while cooling, and means for reducing the pressure of the cooling liquid on the cans and discharging the cans therefrom.

5. A cooker including a cooking chamber, a cooling chamber communicating with the bottom thereof and arranged therebelow, a liquid supply for said cooling chamber, a liquid discharge from said cooling chamber arranged to maintain a required head of liquid in both of said chambers, means for heating the liquid in said cooking chamber, and means for moving cans first through the cooking chamber and then into and through the cooling chamber.

6. A cooker including a cooking chamber and means for passing cans therethrough from the top to the bottom thereof, a cooling chamber communicating with the bottom of said cooking chamber and arranged therebelow and means for passing cans therethrough from said cooking chamber to the exterior thereof, liquid inlet and discharge means connected to said cooling chamber whereby liquid is maintained at a required height in said cooking chamber, and means for heating that portion of the liquid in said cooking chamber.

7. A cooker including a vertically positioned cooking chamber, a helical track therein, a vertically positioned cooling chamber, a helical track therein, the cooling chamber being below the cooking chamber, means for directing cans from said first mentioned track in the cooking chamber onto the second mentioned track in the cooling chamber without exposure to the atmosphere, means for discharging cans from said cooling chamber, and means to submerge portions of said tracks and discharging means.

8. A cooker including a cooking chamber, means for moving cans therethrough, a cooling chamber, means to discharge from the cooking chamber into said cooling chamber without exposure to the atmosphere, a conveyor adapted to receive cans from said cooling chamber and located outside of said chamber, an enclosure for said conveyor, and means for maintaining a given height of liquid in said chambers and said conveyor enclosure whereby the cans are subjected to gradually increasing and then gradually decreasing hydrostatic pressure.

9. A cooker including a cooking chamber, a cooling chamber communicating with the bottom thereof and arranged therebelow, means for introducing liquid to both of said chambers, means for heating the liquid in said cooking chamber, and means for moving cans first through the cooking chamber and then into and through the cooling chamber without exposure to the atmosphere means for discharging cans from the lower end of said cooling chamber, and means for maintaining an exterior pressure on the cans in both said chambers sufficient to prevent rupture of the cans by internal pressure.

10. A cooker including a cooking chamber, means for passing cans therethrough from the top to the bottom thereof, a cooling chamber communicating with the bottom of said cooking chamber and arranged therebelow, means for passing cans through said cooling chamber, means for passing cans from the cooking chamber to the cooling chamber without exposure to the atmosphere means for discharging cans from the lower end of said cooling chamber; liquid inlet and discharge means connected to said chambers, means for heating the liquid in said cooking chamber; and means for maintaining an exterior pressure on the cans in both said chambers sufficient to prevent rupture of the cans by internal pressure.

11. Cooking apparatus comprising a cooking chamber; a cooling chamber below the cooking chamber; means for passing cans successively through the cooking chamber and the cooling chamber without exposure to the atmosphere means for discharging cans from the lower end of said cooling chamber; means for producing the desired cooking temperature in the cooking chamber; means for maintaining the desired cooling temperature in the cooling chamber, and means for maintaining sufficient exterior pressure on the cans to prevent rupture thereof during both the cooking and cooling thereof.

12. A vertically positioned cooking apparatus comprising a cooking chamber having a spiral canway; a vertically positioned cooling chamber having a spiral canway; means for feeding cans into the cooking chamber; means for passing cans from the cooking chamber into the cooling chamber without exposure to the atmosphere; means for delivering cans from the lower end of the cooling chamber; means for producing the desired cooking temperature in the cooking chamber; means for maintaining the desired cooling temperature in the cooling chamber; and means for maintaining sufficient exterior pressure on the cans to prevent rupture of the cans by internal pressure during both the cooking and cooling thereof.

13. Apparatus for cooking canned foods comprising a cooking chamber; a cooling chamber separate from the cooking chamber and below said cooking chamber; means for passing cans successively through the cooking chamber and the cooling chamber and from the cooking chamber to the cooling chamber without exposure to the atmosphere and a conveyor outside the cooling chamber for removing the cans from the lower end of said cooling chamber; means for producing the desired cooking temperature in the cooking chamber; means for maintaining the desired cooling temperature in the cooling chamber; means for maintaining exterior pressure on the cans in excess of the interior pressure therein in the cooking chamber; and means for maintaining exterior pressure on the cans greater than the interior pressure during the cooling thereof.

14. Apparatus for cooking canned foods comprising a vertically positioned cooking chamber having a spiral canway; a vertically positioned cooling chamber having a spiral canway; means for feeding cans into the cooking chamber; means for passing cans from the cooking chamber into the cooling chamber without exposure to the atmosphere; means for delivering cans from the lower end of the cooling chamber; means for producing the desired cooking temperature in the cooking chamber; means for maintaining the desired cooling temperature in the cooling chamber; means for maintaining exterior pressure on the cans in excess of the interior pressure therein in the cooking chamber; and means for maintaining exterior pressure on the cans greater than the interior pressure during the cooking thereof, the passing thereof and the cooling thereof; whereby rupture of the cans by internal pressure is prevented.

ALBERT REYNOLDS.